June 26, 1928.
C. H. CUNO
ELECTRIC CIGAR LIGHTER
Filed Sept. 19, 1925
1,675,293
2 Sheets-Sheet 1
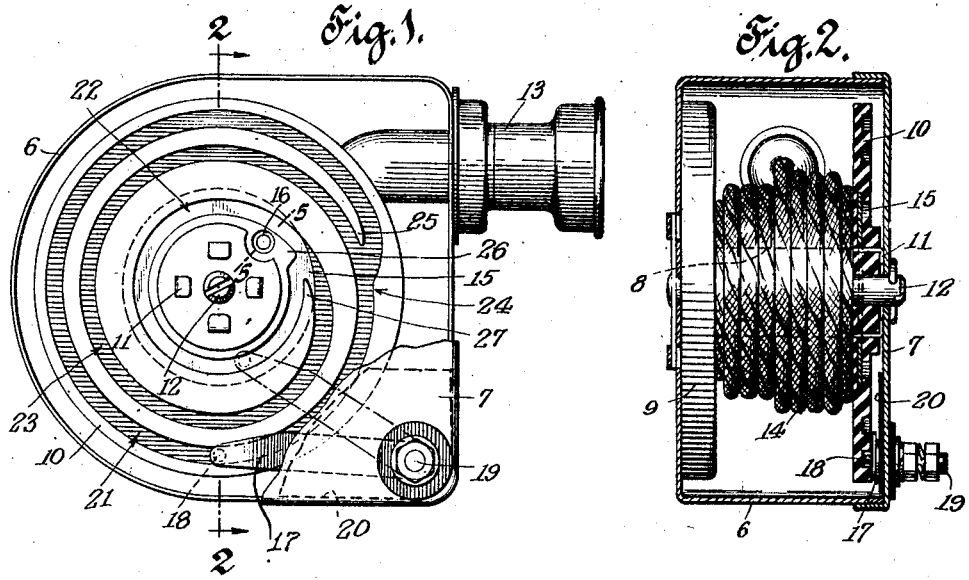
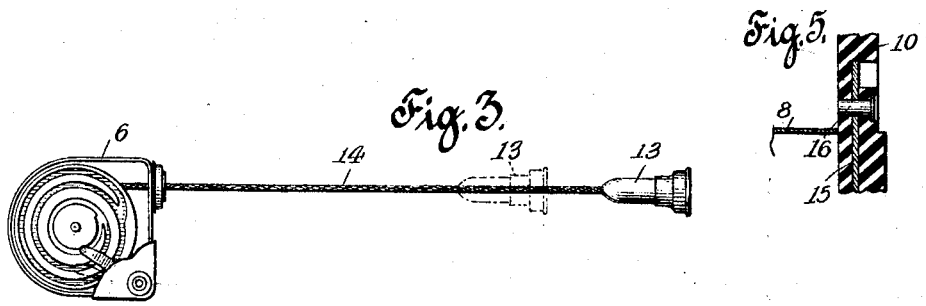
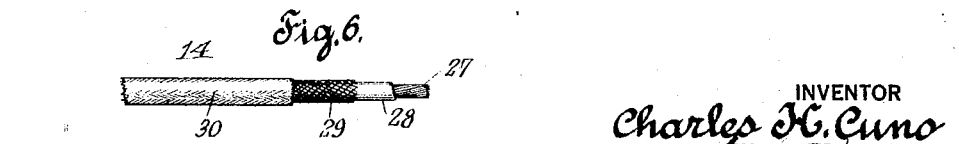
INVENTOR
Charles H. Cuno
BY June 26, 1928. 1,675,293

C. H. CUNO

ELECTRIC CIGAR LIGHTER

Filed Sept. 19, 1925 2 Sheets-Sheet 2

Inventor
Charles H. Cuno
Attorney

Patented June 26, 1928.

1,675,293

UNITED STATES PATENT OFFICE.

CHARLES H. CUNO, OF MERIDEN, CONNECTICUT, ASSIGNOR TO THE CUNO ENGINEERING CORPORATION, OF MERIDEN, CONNECTICUT, A CORPORATION OF CONNECTICUT.

ELECTRIC CIGAR LIGHTER.

Application filed September 19, 1925. Serial No. 57,349.

My invention relates particularly to a self-winding reel and switch for cigar lighters and trouble lamps for automobiles and the like and a cable or conductor cord therefor.

One object is to provide a simple but reliable switch for turning on the current automatically when the cigar lighter has been drawn out the minimum distance for lighting and keeping it "on" as the cord is drawn out and opening the circuit automatically soon after rewinding is begun and regardless of the distance to which the cord has previously been drawn out.

Another object is to provide a durable cord of small diameter so that an extra long length can be contained on a given size reel.

Fig. 1 is a side view of a device embodying one form of my invention, one side of the casing being broken away to show the switch, the lighter being "in" and the switch "open" or "off".

Fig. 2 is a vertical sectional view on the plane of the line 2—2 of Fig. 1.

Figs. 3 and 4 are side views similar to Fig. 1 but on a smaller scale and showing the cigar lighter in different drawn out positions—the full line positions being with the current "on" and the dotted positions "off".

Fig. 5 is a detail sectional view showing the connection to the rotatable switch member.

Fig. 6 is a fragmentary view of the preferred form of conductor.

Figure 7:
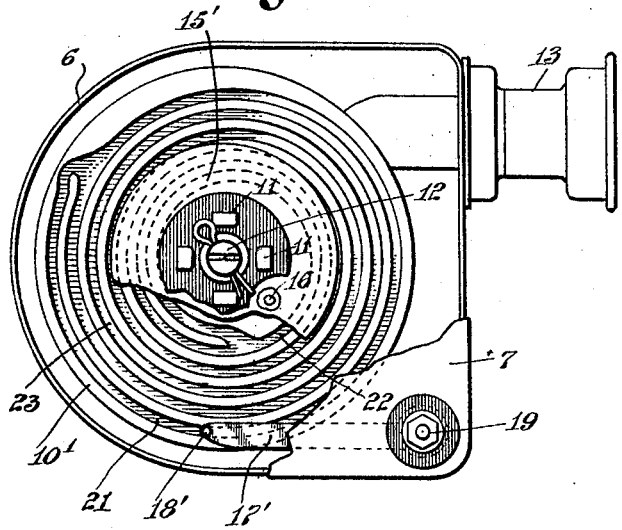
Fig. 7 is a side view of the preferred form of device one side of the casing being removed.
Figure 8:
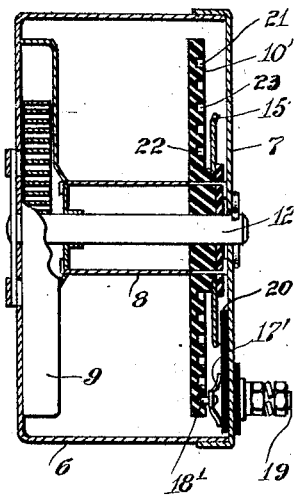
Fig. 8 is a vertical sectional view of the device of Fig. 7.
Figure 9:
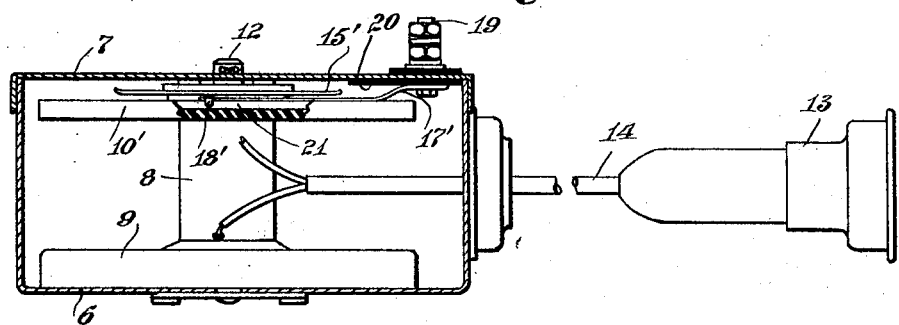
Fig. 9 is a section and plan of the same.

The casing may be of any suitable form for instance having a body 6 and removable side 7 formed of sheet metal.

The reel or drum has a tubular metal hub 8 with flanges 9 and 10. The flange 9 houses the usual winding spring. The flange 10 is formed of a disc of insulating material and is secured to the hub by lugs or tangs 11. A central spindle 12 supports the reel and holds the parts of the casing together.

The cigar lighter or other translating or current consuming device 13 is connected to the reel by the cord 14 which has one conductor connected to the hub 8 or to the flange 9 (and hence grounded) and the other conductor connected to a conductive metal plate 15 embedded in and rotatable with the disc 10—a hole 16 being provided into which the conductor is inserted and where it is soldered to the plate 15.

The spring arm 17 carries a contact point 18 adapted to engage the contact plate 15. This arm is hinged to the circuit terminal 19 and is held in place by its pressure against the insulating sheet 20.

The disc 10 has grooves or paths 21, 22 and 23 which constitute cams for controlling the contact arm as the disc is rotated. The outer and inner grooves 21 and 22 are substantially concentric with the hub. The current is "off" when the contact point 18 is in the outer groove 21 and "on" when the point is in the inner groove 22 resting against the contact plate 15. These grooves are substantially non-progressive. The connecting groove 23, however, is spiral and causes the contact point to move outward or inward depending upon whether the cord is being wound or unwound.

The shoulder 24 pushes the contact point inwardly and the projecting finger 25 directs the contact point into the spiral connecting groove as the cord is drawn out. Friction of the arm 17 against the sheet 20 prevents the arm from falling while the contact point passes from the shoulder 24 to the beginning of the spiral progressive or contact moving groove.

As the cord is drawn out a little more than one turn of the reel (in this instance about one and one quarter turns) the contact point 18 is moved into engagement with the contact plate 15 and the current is "on". The inner groove 22 is so shaped that the switch will stay on so long as the cord is being held stationary or being pulled out still further.

When the cord is released the circuit will be interrupted as soon as the reel has turned far enough to permit the shoulder 26 and the finger 27 to move the contact point 18 off the plate 15 and into the spiral connecting groove 22.

It will be seen that this construction permits the reel to turn an indefinite number of times with the contact "off" or "on" so that a cord of any length may be used and the switch will always operate the same regardless of the length and without danger of the contacts being displaced or the apparatus disabled.

The cable or cord is preferably formed with a multi-stranded conductor core 27 embedded in a sheath 28 of suitable insulating composition such as gutta-percha or rubber. Around this is braided another conductor 29 also formed of fine wires. This enables me to get the necessary strength, flexibility, and conductivity with a minimum diameter of cord and expense.

Since the outer conductor 29 is grounded it is not absolutely necessary that it be covered with insulation but I prefer to provide a braided covering 30.

In the preferred form of Figs. 7 to 10 the contact plate 15' is secured to the hub side of the insulating disc 10'; the contact arm 17' is guided by the pin 18' in the grooves in the cam disc and the outside of the arm is adapted to engage the plate 15' as the cord is drawn out and the reel rotated. The various grooves are preferably so proportioned with respect to the size of the reel and the size of the conductor cord that about one and a half to two feet of cord are drawn out before the switch is turned on and reversely the switch is turned off when about a foot and a half to two feet has been rewound.

This arrangement ensures a maximum of safety and convenience and a minimum of current consumption. There is also very little wear on the grooves and the contacts.

Figure 10:
Fig. 10 is a sectional view of another form of switch member.

In the form as shown in Fig. 10 the insulating disc 10ª has the outer groove and part of the spiral and the inner groove and part of the spiral are formed in the metal disc 15ª. The action of this form is similar to that of Figs. 1 and 2.

The flexible conductor is claimed in my application 122,794, filed July 16th, 1926.

I claim:

1. An electric cigar lighter switch comprising a cam member having two circumferentially complete non-progressive guide grooves and a connecting progressive groove, a conductive member carried by said cam member adjacent one of said non-progressive grooves, and an arm having a contact adapted to be automatically propelled by said grooves.

2. In an electric switch, a cam member having two continuous concentric grooves and a spiral connecting groove, a conductive member carried by said cam member spaced apart from one of said concentric grooves and a contact arm guided by said grooves.

3. In an electric switch, a cam member having two continuous concentric grooves and a spiral connecting groove of the same depth, a conductive member adjacent one of said concentric grooves and a contact arm guided by said grooves, each of said concentric grooves having a deflecting shoulder projecting toward said connecting groove to direct said contact arm into said connecting groove under certain circumstances and means for frictionally holding said arm in its various positions.

4. A reel comprising a cable drum, a spring for winding said drum in one direction, an insulating disc forming one flange of said drum and having two concentric grooves and a connecting spiral groove, a conductive wall adjacent one of said concentric grooves, a cable wound on said drum having one conductor grounded on said drum and the other connected to said conductive wall and a contact arm guided in said grooves.

5. In an electric switch, a reel, an insulating cam member carried thereby and having two concentric circumferentially complete grooves and a connecting progressive groove, a conductive member carried by said cam member, adjacent said inner groove, a cord wound on said reel and an arm having a contact adapted to be automatically propelled in said grooves from the outer to the inner groove as the cord is pulled out.

6. In a switch, an insulating cam having two continuous grooves, one surrounded by the other and a spiral connecting groove, a conductive member adjacent the inner groove and a contact arm guided by said grooves, each of said continuous grooves having a deflecting shoulder to direct said contact arm into said connecting groove under certain circumstances.

7. A reel comprising a cable drum, a spring for winding said drum in one direction, an insulating disc forming one flange of said drum and having two concentric grooves and a connecting spiral groove, a conductive wall adjacent one of said concentric grooves, a cable wound on said drum having an outer conductor grounded on said drum and an inner conductor connected to said conductive wall and a contact arm guided in said grooves.

8. A reel having a conducting flange at one end and an insulating disc with a groove at the other end and a conductor adjacent said disc and having a portion exposed near said groove, said disc and plate having a passage, a conductor wire connected to said conductor in said passage and a conductor wire grounded on said flange.

9. A switch reel having an insulating disc with a projecting hub, a contact plate mounted in said hub, said disc having two concentric continuous grooves and a connecting progressive groove, and a swinging contact arm guided by said grooves and adapted to engage beneath said contact plate.

10. A switch reel comprising an insulating disc having two concentric continuous grooves and a connecting spiral groove, a contact arm guided by said grooves, and a contact rotatable with said disc and contacting with said contact arm while said arm is guided by the inner continuous groove and also while it is guided by a substantial part of said spiral groove.

11. In an electric switch, a cam member having two circumferentially complete non-progressive cam paths and a connecting progressive path, a contact arm comprising a follower engaging said paths, a conductive member carried by said cam member, and a contact adapted to be automatically propelled by said paths into and out of engagement with said conductive member.

CHARLES H. CUNO.